US009785322B2

(12) United States Patent
Soroka

(10) Patent No.: US 9,785,322 B2
(45) Date of Patent: Oct. 10, 2017

(54) ENCAPSULATED INTERACTIVE SECONDARY DIGITAL MEDIA PROGRAM, SYNCHRONIZED AND ASSOCIATED WITH A DISCRETE PRIMARY AUDIO OR VIDEO PROGRAM

(71) Applicant: LITTLE ENGINES GROUP, INC., Topanga, CA (US)

(72) Inventor: Howard David Soroka, Topanga, CA (US)

(73) Assignee: LITTLE ENGINES GROUP, INC., Topanga, CA (US)

( * ) Notice: Subject to any disclaimer, the term of this patent is extended or adjusted under 35 U.S.C. 154(b) by 561 days.

(21) Appl. No.: 14/462,383

(22) Filed: Aug. 18, 2014

(65) Prior Publication Data

US 2015/0160915 A1 Jun. 11, 2015

Related U.S. Application Data

(60) Provisional application No. 61/914,391, filed on Dec. 11, 2013.

(51) Int. Cl.

| | |
|---|---|
| ***G10H 1/36*** | (2006.01) |
| ***G06F 3/0484*** | (2013.01) |
| ***G11B 27/031*** | (2006.01) |
| ***H04N 21/43*** | (2011.01) |
| ***H04N 21/439*** | (2011.01) |
| ***H04N 21/854*** | (2011.01) |
| ***H04N 21/8547*** | (2011.01) |

(52) U.S. Cl.
CPC ........ *G06F 3/04842* (2013.01); *G11B 27/031* (2013.01); *H04N 21/43* (2013.01); *H04N 21/439* (2013.01); *H04N 21/854* (2013.01); *H04N 21/8547* (2013.01)

(58) Field of Classification Search
CPC ........... G10H 1/0058; G10H 2240/145; G10H 1/365; G10H 1/383; G10H 2210/101; G10H 2220/155
See application file for complete search history.

(56) References Cited

U.S. PATENT DOCUMENTS

2004/0159221 A1* 8/2004 Camiel ................ G10H 1/0041 84/660
2006/0000344 A1* 1/2006 Basu .................... G10H 1/0025 84/612

(Continued)

*Primary Examiner* — Marlon Fletcher
(74) *Attorney, Agent, or Firm* — SoCal IP Law Group LLP; Steven C. Sereboff; Jonathan Pearce

(57) ABSTRACT

There is disclosed an apparatus and method including accessing data comprising a primary program comprising media suitable for linear playback, enabling access to a secondary program, made up of a plurality of channels and associated with the primary program, the secondary program time-synchronized to the primary program, and accepting user interaction identifying at least one of the plurality of channels for playback in synchronicity with the primary program. The method further includes accepting user interaction including configuration characteristics of the playback of the at least one of the plurality of channels on one or more displays, and enabling playback of the primary program in conjunction with the at least one of the plurality of channels as directed by the configuration characteristics.

17 Claims, 3 Drawing Sheets

(c) 2014 Little Engines Group, Inc.

(56) References Cited

U.S. PATENT DOCUMENTS

| | | | | |
|---|---|---|---|---|
| 2006/0032362 A1* | 2/2006 | Reynolds | G09B 15/00 | 84/601 |
| 2010/0050853 A1* | 3/2010 | Jean | G10H 1/365 | 84/609 |
| 2013/0087037 A1* | 4/2013 | Dreher | G10H 1/0066 | 84/645 |
| 2014/0053712 A1* | 2/2014 | Dreher | G10H 1/0033 | 84/645 |

* cited by examiner

Figure 1 - ESSP Authoring Tool for Synchronized Lyrics (words)
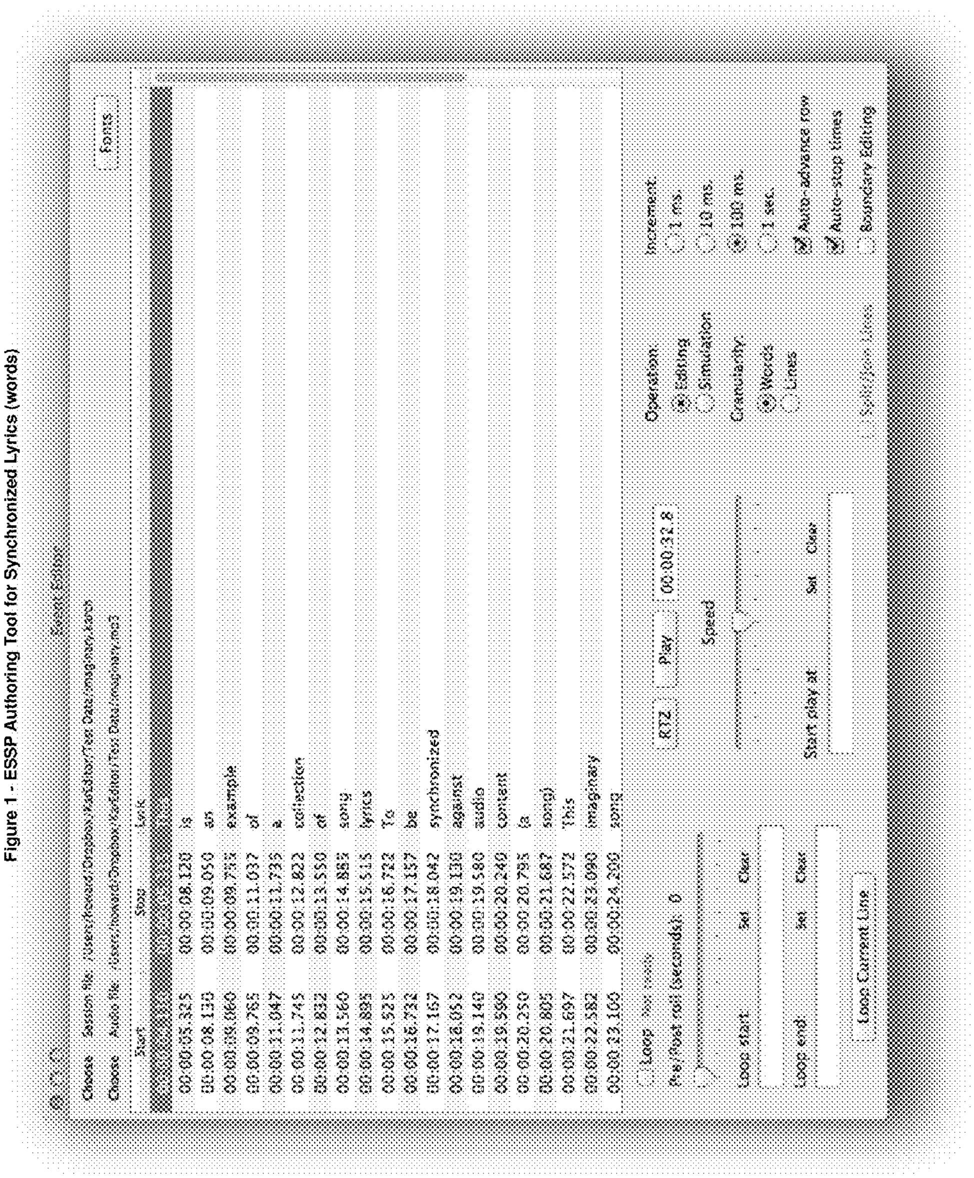
(c) 2014 Little Engines Group, Inc.

Figure 2 - Collaborative Authoring Process
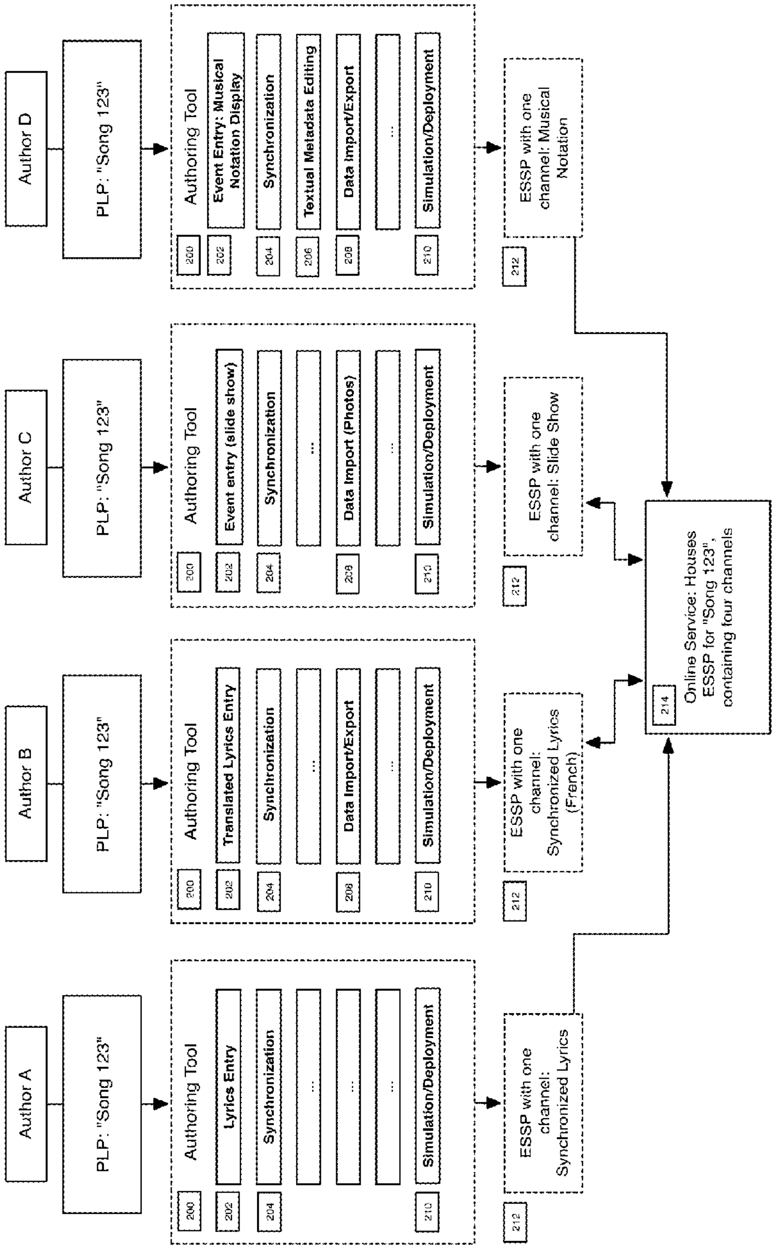
(c) 2014 Little Engines Group, Inc.

Figure 3 - Active Rendering (on-screen Simulation) of synchronized lyrics (first channel of ESSP) with simultaneous graphic representation of instrument instructions as second metadata channel (second channel of ESSP)
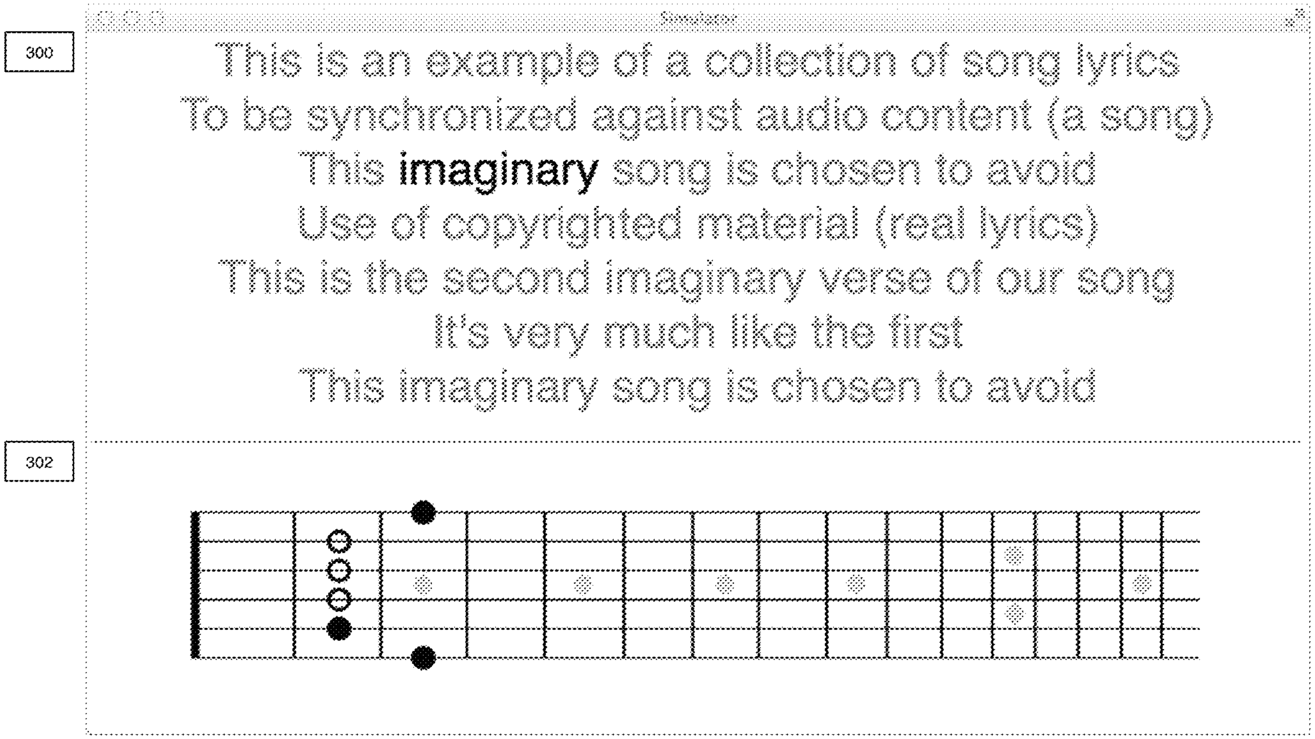
(c) 2014 Little Engines Group, Inc.

ENCAPSULATED INTERACTIVE SECONDARY DIGITAL MEDIA PROGRAM, SYNCHRONIZED AND ASSOCIATED WITH A DISCRETE PRIMARY AUDIO OR VIDEO PROGRAM

RELATED APPLICATION INFORMATION

This patent claims priority from provisional patent application No. 61/914,391 filed Dec. 11, 2013 titled "ENCAPSULATED INTERACTIVE SECONDARY DIGITAL MEDIA PROGRAM, SYNCHRONIZED AND ASSOCIATED WITH A DISCRETE PRIMARY AUDIO OR VIDEO PROGRAM".

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

The invention is an entirely new communication medium: an encapsulated interactive experiential program, embodied in digital information, which adds interactivity and functionality to a separate linear media program such as a digital audio or digital video file.

The experience of using, or "consuming", audio or video programs such as songs, TV shows, movies, etc., is inherently linear. That is, such a program has a specific duration measurable in hours, minutes, or seconds, and is "consumed" by the listener or viewer from start to finish. We therefore refer to this type of program as a "linear" experience. Further, the role of the viewer is passive and non-interactive—there is nothing for this person to do except to listen and/or to view.

As opposed to linear, non-interactive media, there is also a field known as "interactive multimedia", in which elements of linear media such as audio and video are combined with computer software and hardware-based controllers, in order to facilitate interactivity, in which a user is actively involved, and controls the experience. Examples of such interactive media include educational software and computer-based games. In these examples, the linear media and the computer software are tightly interwoven into a single product, such as an interactive CD-ROM, or a single computing device-based or Web-based application.

These well-established technologies are commonplace, and can be very useful, or entertaining. They do, however, have some constraints, which limits their utility and functionality in some ways, and which creates significant financial costs and legal burdens for creators of such interactive media. Some of these burdens are described below in the following paragraphs.

Tight coupling requires license from copyright owners. Because interactive multimedia consists of original software interwoven with audio or video material that is generally subject to copyright law, creators of such products (called "authors") must negotiate and pay for licenses to permit their distribution and sale.

Authoring is complex and highly specialized, and can generally only be performed by trained personnel using expensive tools (typically specialized authoring software).

The cost of such interactive media is high, because the cost of tools, skilled authors, copyright license fees and other components can be very significant. In some disciplines—especially that of education—such economic burdens can frequently be high enough to prevent a great many desirable, beneficial products from being made at all.

Traditional interactive multimedia programs are typically not extensible in terms of functionality. It is generally not possible for one party to add to or otherwise enhance the content of an interactive multimedia program once it has been released to consumers.

Traditional interactive multimedia programs are typically not configurable in terms of their presentation of information. Generally, interactive multimedia products are designed for a single style of deployment environment. Though the user can usually control the flow of activity during use of the product, there is little opportunity to adapt the product to diverse hardware configurations, such as a differing number of multiple display screens from one user's location to another's.

The invention described herein overcomes the above constraints in a number of novel ways, which are enumerated below. From this point forward, for brevity, we will use the name ESSP (Encapsulated Synchronized Secondary Program) for the invention. We will also use the name PLP for the Primary Linear Program—the audio or video file that is associated with the ESSP.

METHODS OF THE INVENTION

De-Coupling from Primary Programs, with Association:

The ESSP is associated with one (or more, but typically one) piece of linear digital media, such as an audio or video file (the PLP). It is however, de-coupled from that file. In simple terms, this means that the computer file containing the audio or video (the PLP) is not the same computer file that contains the ESSP. This is of critical importance. The ESSP is not contained within the same file as the linear media with which it is associated—it is a discrete product. This means that the PLP need never be distributed along with the ESSP. Instead, it is assumed that the ESSP user already has access to the PLP, either by having an actual copy of the PLP on the device upon which the ESSP will be used (such as a computer or mobile phone or table), or by having access to it via a remote server or an Internet-based media streaming service, on the same device. Because the ESSP is separate from the PLP, no royalty payment is owed to the copyright owner(s) for the PLP, in order to acquire the ESSP. The responsibility for legal ownership of, or access to the PLP, is that of the consumer, not the distributor of the ESSP. The ESSP is instead associated with the PLP. That is, the ESSP contains one or more data that specifically identify which PLP it is dependent on for correct deployment.

It is of course technically possible to combine two computer files into one, and it is also possible to embed information in an ESSP. However, these files may each be subject to different and separate copyright protections. Royalty payments for each may be accepted or processed separately. For example, there may be one copyright for the PLP in the form of a recorded song, and another for an ESSP that included the textual lyrics of the song. In such case, a copyright royalty might be due to the publisher of the song, because the lyrics are distributed within the ESSP. No royalty would be due to the owner of the copyright of the PLP, however, because it is not distributed with the ESSP.

Synchronization:

One critical characteristic of the ESSP is that it is primarily comprised of information that is synchronized against the PLP. Just as consumption of the PLP is a real-time experience, consumption of an ESSP also takes place in real time. For example, in a typical embodiment, most of the information contained in an ESSP will be displayed on a device's screen at the precise moment within the PLP at which is it appropriate. One example could be a PLP consisting of a song (audio only), with an ESSP consisting of a structured music lesson teaching the user how to play the chords of the song on a guitar. Graphical diagrams of the guitar chords would appear onscreen at the precise instant when they should be played on the guitar. Every ESSP would likely contain some non-synchronized data as well, but the primary purpose of the invention is to facilitate a meaningful interactive experience that is based on linear media, in real time, for informational, instructional or entertainment purposes.

Formal and Consistent Method of Describing Interactively Presented Information:

The information contained within an ESSP is consistent in format and in meaning. This means that all ESSPs will work in a predictable way, when deployed using software that is compliant with the specifications for data representation for the invention, regardless of who authored them, and regardless of which authoring tools were used in the process.

Encapsulation:

The ESSP is (typically) contained in a single discrete computer file. The encapsulation is versatile—the ESSP can be added to, or subtracted from, and portions of it can be copied to and from other ESSPs, but all of the data within the file serves to facilitate the real-time deployment of the ESSP, in synchrony with the separately stored PLP. The encapsulation of the ESSP allows it to be easily and flexibly operated upon or distributed, with no dependence on the PLP. This includes the ability to manage, distribute, sell or otherwise monetize the ESSP, in a discrete way.

Channelization:

Data within the ESSP is organized into functional "channels". Channels can be authored separately for the same ESSP by different authors, and later combined, or extracted. Each ESSP is, in other words, a collection of one or more channels of (primarily) synchronized data, each of which can be separately addressed, modified or deployed, and which can be combined arbitrarily. An example of discrete channels might include a channel of original (karaoke-style) synchronized textual lyrics, a channel of animated guitar chord diagrams, and a channel of photographs arranged in a timed slide show—all contained within a single ESSP, which is associated with a single PLP (a song file).

Collaborative Authoring:

The invention is designed to facilitate authoring of ESSPs by a diverse population. An author can create any number of channels of data for any single PLP. All of the channels of data for that PLP can be combined into a single "master" ESSP that contains all of the channels of available data for that PLP. Further, selected channels from that "master" can be extracted and combined into smaller ESSPs, which are functional subsets of the master. The individual authors need not work together, or even know each other. Rather, the ESSP is designed to be manageable by automated processes, such as an Internet-based service which "collects" all the channels of data from all of the worlds' authors for any given PLP, stores, manages, and redistributes them as necessary. The channelized architecture and collaborative authoring capabilities of ESSPs makes them, quite intentionally, ideally suited to "crowd-sourcing" methods of creation. Simply put, the ESSP is designed so that anyone who wants to create one can do so, and share their work with all interested parties, for mutual benefit. Unlike the traditional interactive multimedia authoring paradigm, the support for crowd-sourcing and sharing of ESSPs means that they can be created for extremely low costs.

Extensibility:

ESSPs, because of their channelized, modular nature, can be extended in functionality at any time. Volunteer authors, at any given time, might create a basic set of functional ESSP channels associated with a single popular PLP. At any time following, other authors might create new channels facilitating entirely new functionality. The centralized Internet-based storage and management service (see above) collects all of these channels (via Internet upload from each author), allowing the aggregate functionality embodied in ESSPs for each PLP to grow, without limits, over time.

Configurability:

Again, because of the channelized architecture of the ESSP, a user can, at time of its deployment (informally, this may be called "playback", and technically, this is called "rendering") configure the behavior of each channel to his/her own needs or desires. For example, an end-user might acquire a complex ESSP comprised of numerous channels of synchronized data for a single PLP. In the case of a single song file, this could include animated (synchronized) lyrics in several languages, guitar chords, bass guitar tablature (simplified musical notation), images arranged as timed slideshows, and more. A user might decide to show only the English lyrics on one screen of a computer, using a specific font and color scheme, and show the guitar chords on another screen of the same computer, while disabling the rendering of all other channels.

Dynamic Functionality:

While the previous paragraph describes "Configurability" as methods whereby a user can control playback parameters of an ESSP, Dynamic Functionality extends this concept from primarily the visual characteristics of the data being played back, to an entirely new semantic interpretation of the same data. This means that the same synchronized data, created one time by an author of an ESSP, can be interpreted (not just displayed) in more than one way, under the user's control. The best way to explain this is again, by musical example: an author might create a single channel of an ESSP that contains synchronized guitar chords for a song. This can obviously be interpreted to create, at playback time, a display of guitar chord diagrams, many characteristics of which can be configured, as described in the previous paragraph. This information can also be interpreted, using musically-intelligent algorithms at playback time (under user control), to generate an animated display of "correct usable notes", for a bass guitarist as well. The net effect is that the author creates a channel of guitar chords, but the ESSP contains suitable data to allow a playback application, under user control, to generate not just a synchronized display of guitar chord symbols, but also a display of correct notes to be used when improvising a bass guitar part. This is an entirely different type of display, not showing chord symbols at all, and for a different instrument. This is facilitated by the ESSP, because it can contain channels of musical information that are richer than mere chord symbols, enabling new functionality to be derived from the same data, dynamically, under user control.

Embodiment and Capabilities

The ESSP is embodied in a file of digital data stored on a device such as a desktop or laptop computer, or a mobile phone or tablet. The functional components of the file include (but are not limited to):

Relevant data such as lyrics, musical notation, images, textual comments or instructions, animated sequences of images or text, and many other forms of information, which are most often synchronized against the time base of the PLP. These typically imply the display of information on a screen.

Other forms of valid data that do not imply any visual display, such as commands to be sent from the rendering device to an external system of some kind, such as a lighting controller connected to the host computer (enabling a synchronized light show at a public venue).

Synchronized commands used by an internal audio mixing function. This enables "automated mixing" of multiple channels of audio, when present in a PLP, but does not necessarily imply any screen display. Such automated mixes can include all aspects of audio mixing functionality including real-time changes to such audio parameters as volume, stereo pan or placement within a multichannel sound space (such as "5.1 Channel Surround Sound"), equalization, special effects, mutes, solos, logical to physical channel assignments, speed and pitch adjustments, selection of encoding and decoding parameters for headphone listening environments, and other functionality.

Non-real-time structural data that describes ordered methods for effective deployment of the real-time data. Examples of this might be data which describes the "structure" of an interactive music lesson, which is itself made up of segments of real-time interactivity, organized in a logical way as to achieve a goal. Such a structural data set might represent a sequence of learning steps: a portion dedicated to learning the first verse of a song, followed by another teaching the second verse, another teaching the chorus, and so forth. Such structural information can be used for any educational (or informational or entertainment purpose, and is not in any way limited to only musical instruction).

Non-real-time configuration data which describes specific parameters pertaining to the deployment of channels of data within the ESSP, but which might be overridden or reconfigured by an end user. Examples of this would be "default" screen or screen portion assignments for specific channels, including fonts, colors, graphic styles, and other aesthetic decisions.

Static data which is not synchronized, but is important in enabling other functionality, such as artist, song, album, video, film, or TV episode names, and audio signal "fingerprint" data, all of which are used to reliably identify the PLP on which the ESSP is based, without containing any content of the ESSP which is subject to copyright.

Authoring and Rendering

Authoring:

The ESSP is created by authors using a software application on a computer, mobile phone or tablet, or similar device. The authoring application facilitates (minimally):

Selection of an external file to be used as a PLP—this can be an audio or a video file of any type.

Entry and comprehensive editing of all forms of data that can be used to form the behaviors of the ESSP.

Assignment of specific data sets into logical channels, each of which serves a specific purpose, and each of which is independent of all other channels in order to serve its purpose.

Precise synchronization of all data events (such as animations of lyrics text, or digitally communicated commands to an automated audio mixing device) against the timing of the PLP. This can include allowing the user to enter synchronization commands in real time, while the authoring is playing the PLP, at any speed, and by any data entry method. It also includes the ability to specify timing information using manual (hand-typed) or other non-real-time methods.

Creation of all static metadata needed to identify the ESSP's association with a specific PLP.

Encapsulation of all entered data, synchronized and unsynchronized, into a computer file, compliant with the data format specification for ESSPs.

Transmission of such ESSP files to and from other entities across the Internet.

Fully functional, tightly synchronized rendering of ESSPs within the authoring environment, including playback of de-coupled PLP files. In other words, an authoring tool for an ESSP is also (in almost all cases) a fully capable playback tool for ESSPs.

Deployment, or "Rendering":

An ESSP has little value, if any, without a PLP. To deploy an ESSP in a meaningful way, it must be rendered in synchrony with the PLP. Specifically, a software (or firmware) application on a computing device of some kind must simultaneously render the PLP and the ESSP. The PLP is rendered by playing it back on the appropriate combination of attached audio/video hardware. The ESSP is played back at the same time, tightly synchronized to the PLP, using the same hardware, or other attached hardware, or peripheral hardware attached to the host computing device. For example, in the case of an ESSP for a PLP consisting of a song file (audio only), the song can be played back over the computer's speakers, while the visual information comprising the ESSP is displayed on its screen(s). In the case of an ESSP for a PLP consisting of a video file, the ESSP's visual information may be rendered on a second screen, separate from the primary screen displaying the PLP video itself, or within a separate portion of the same single screen (i.e. a "window"), or overlaid (superimposed) onto the video itself, in a single window or single screen. These examples are not comprehensive—there are numerous other ways in which hardware configurations can be designed to accommodate specific behaviors for ESSPs, and vice versa.

DESCRIPTION OF THE DRAWINGS

FIG. 1: Sample screen of ESSP Authoring Tool.

FIG. 2: Collaborative Authoring Process.

FIG. 3: Example screen from rendering of ESSP.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

Identification of Components for Illustrations of Invention:

| Reference Numeral | Name of Component |
| --- | --- |
| 200 | Authoring Tool |
| 202 | Text data entry function of authoring tool |
| 204 | Synchronization function of authoring tool |

-continued

| Reference Numeral | Name of Component |
|---|---|
| 206 | Textual metadata editing function of authoring tool |
| 208 | Data import function of authoring tool |
| 210 | Rendering component of authoring tool |
| 212 | Invention: ESSP containing one or more channels of synchronized data |
| 214 | Online service housing collections of ESSPs from diverse authors |
| 300 | Display of synchronized lyrics |
| 302 | Display of animated guitar chord diagrams |

DETAILED DESCRIPTION

FIG. 1 shows a sample screen from an ESSP authoring tool. In this example, the screen shows a set of (artificial) song lyrics, each word of which is associated by the user with two specific points in time, relative to the start time of the PLP (00:00:00.000). The Start time is the time at which the word should be highlighted on the screen, the Stop time is the time at which the highlight is turned off. The other controls present on the screen are primarily used to manage the playback of the PLP during authoring, to facilitate real-time entry of Start and Stop times in various ways. Two file names are shown near the top of the screen. The first is the "Session" file name—this is actually the ESSP file itself during the authoring process. The second is the name of the PLP—an audio only file.

FIG. 2 shows a logical depiction of collaborative authoring for a theoretical ESSP for a single song. Using the Authoring Tool software 200, the first author creates a single channel, consisting of a set of synchronized lyrics in the original language (presumably English). Various minor functions of the authoring tool are shown by numerals 202, 204, 206, 208, and 210. The second author creates a single channel consisting of synchronized lyrics, translated to French. The third author creates a single channel consisting only of images, synchronized to the song in a slideshow fashion. The fourth author creates a single channel consisting only of musical notation for the song. After each author's work is complete, the Authoring Tool 200 uploads the individual channels to an online service, which assembles them together into a master ESSP, containing all four of the separately created channels. Consumers of ESSPs are then able to, using the same service, select and download only those channels from the master ESSP they desire.

FIG. 3 shows a sample screen from the rendering of two channels of an ESSP. The upper portion of the screen 300 shows one channel—a set of (artificial) song lyrics, with one word highlighted ("imaginary") at the precise time at which it is sung during the simultaneous rendering of the PLP. The lower portion of the screen shows another channel—the graphic animated display of guitar chords, also synchronized to the PLP. The chord symbol using solid black dots represent the current chord at the instant the screen image is captured. The chord symbol using hollow black dots represent the next chord to be played. FIG. 3, in other words, is an example of an ESSP which serves the purpose of teaching a user how to sing and play a song.

It is claimed:

1. Apparatus comprising a storage medium storing a program having instructions which when executed by a processor will cause the processor to:

access data comprising a primary program comprising media suitable for linear playback;

enable access to a secondary program, made up of a plurality of channels and associated with the primary program, the secondary program time-synchronized to the primary program;

accept user interaction identifying at least one of the plurality of channels for playback in synchronicity with the primary program;

accept user interaction including configuration characteristics of the playback of the at least one of the plurality of channels on one or more displays;

enable playback of the primary program in conjunction with the at least one of the plurality of channels as directed by the configuration characteristics; and wherein a given channel of the plurality of channels may be used to automatically generate related channels and wherein the given channel is a set of chords for an instrument and the related channels are one or more of: a set of notes for another instrument, a set of chords for another instrument, and a set of rhythm charts.

2. The apparatus of claim 1 wherein at least two of the plurality of channels were generated by different individuals.

3. The apparatus of claim 1 further comprising accepting user payment for the at least one of the plurality of channels separately from any payment for the primary program.

4. The apparatus of claim 3 wherein the secondary program is distributed separately from the primary program.

5. The apparatus of claim 1 wherein the secondary program is associated with the primary program based upon intrinsic characteristics of the primary program such that an alternate version of the secondary program is automatically generated and associated with a corresponding alternate version of the primary program.

6. The apparatus of claim 1 wherein the playback of the primary program in conjunction with the at least one of the plurality of channels excludes channels of the plurality of channels that were not identified.

7. The apparatus of claim 1 wherein the instructions, when executed by a processor, will further cause the processor to enable a user to add additional channels to the plurality of channels.

8. The apparatus of claim 1 further comprising a video display for displaying playback of the primary program in conjunction with the at least one of the plurality of channels as directed by the configuration characteristics.

9. The apparatus of claim 1 further comprising:

a processor a memory wherein the processor and the memory comprise circuits and software for performing the instructions on the storage medium.

10. A method comprising:

accessing data comprising a primary program comprising media suitable for linear playback;

enabling access to a secondary program, made up of a plurality of channels and associated with the primary program, the secondary program time-synchronized to the primary program;

accepting user interaction identifying at least one of the plurality of channels for playback in synchronicity with the primary program;

accepting user interaction including configuration characteristics of the playback of the at least one of the plurality of channels on one or more displays;

enabling playback of the primary program in conjunction with the at least one of the plurality of channels as directed by the configuration characteristics; and wherein a given channel of the plurality of channels may be used to automatically generate related channels and wherein the given channel is a set of chords for an instrument and the related channels are one or more of: a set of notes for another instrument, a set of chords for another instrument, and a set of rhythm charts.

11. The method of claim 10 wherein at least two of the plurality of channels were generated by different individuals.

12. The method of claim 10 further comprising accepting user payment for the at least one of the plurality of channels separately from any payment for the primary program.

13. The method of claim 12 wherein the secondary program is distributed separately from the primary program.

14. The method of claim 10 wherein the secondary program is associated with the primary program based upon intrinsic characteristics of the primary program such that an alternate version of the secondary program is automatically generated and associated with a corresponding alternate version of the primary program.

15. The method of claim 10 wherein the playback of the primary program in conjunction with the at least one of the plurality of channels excludes channels of the plurality of channels that were not identified.

16. The method of claim 10 wherein the instructions, when executed by a processor, will further cause the processor to enable a user to add additional channels to the plurality of channels.

17. The method of claim 10 wherein a video display is used for enabling playback of the primary program in conjunction with the at least one of the plurality of channels as directed by the configuration characteristics.

* * * * *